United States Patent [19]

Herchenroeder

[11] 3,832,641

[45] Aug. 27, 1974

[54] VOLTAGE REFERENCE SOURCE ADJUSTABLE AS REGARDS AMPLITUDE PHASE AND FREQUENCY

[75] Inventor: Louis W. Herchenroeder, Williamsville, N.Y.

[73] Assignee: Westinghouse Electric Corporation, Pittsburgh, Pa.

[22] Filed: Oct. 18, 1973

[21] Appl. No.: 407,726

[52] U.S. Cl. .................. 328/258, 328/62, 328/140, 328/153, 331/45, 331/60

[51] Int. Cl. .................. H03k 1/02

[58] Field of Search ....... 328/61, 62, 133, 134, 140, 328/258, 153; 331/45, 60

[56] References Cited

UNITED STATES PATENTS

| | | | |
|---|---|---|---|
| 3,562,555 | 2/1971 | Ahrons | 328/258 X |
| 3,591,858 | 7/1971 | Boyd | 328/140 X |
| 3,633,113 | 1/1972 | Grubel | 328/62 X |
| 3,663,885 | 5/1972 | Stewart | 328/140 |
| 3,710,276 | 1/1973 | Dao | 331/45 |
| 3,789,308 | 1/1974 | Lowdenslager | 328/140 X |

*Primary Examiner*—John S. Heyman
*Attorney, Agent, or Firm*—J. J. Wood

[57] ABSTRACT

A voltage reference source is provided in which a pulse source under the regimen of logic circuitry disciplines the count of two digital counters, one for counting a cosine function through 360 electrical degrees, the other counting a sine function through 360 electrical degrees. Digital to analog converters coupled to the respective counters convert the digital intelligence into analog wave forms Vm cos $\omega t$ and Vm sin $\omega t$.

Additionally by algebraic summation operational amplifiers are used to convert the two phase outputs Vm cos $\omega t$ and Vm sin $\omega t$ into a three phase voltage output.

10 Claims, 3 Drawing Figures

FIG.1

VOLTAGE REFERENCE SOURCE ADJUSTABLE AS REGARDS AMPLITUDE PHASE AND FREQUENCY

BACKGROUND OF THE INVENTION

1. Field of the Invention

This invention relates to a voltage reference source which can be adjusted to vary the amplitude phase and frequency of the voltage output.

2. Description of the Prior Art

There is a perennial need in the electronic arts for cheap, versatile and reliable voltage sources. Adjustable frequency voltage reference sources are used with power supplies such as cycloconverters. Usually a polyphase reference is required with low harmonic distortion, and an accurate, stable phase relationship. Adjustment of frequency voltage peak magnitude is also a requirement.

The instant invention is intended to provide a source to satiate the parameters, amplitude, phase and frequency adjustment in a cheap and versatile, but wholly reliable system.

SUMMARY OF THE INVENTION

A voltage source is provided having means for producing pulses, means for digitally counting a cosine function through 360 electrical degrees, and means for digitally counting a sine function through 360 electrical degrees. Logic means coupled to both the pulse source and the counting means, logically directs the counting in ordered fashion in accordance with the sine and cosine functions respectively. Means are coupled to the cosine counting means for converting the digital intelligence into an analog cosine waveform $v = \text{Vm} \cos\omega t$. Similarly means are coupled to the sine counting means for converting the digital intelligence into an analog sine waveform $v = \text{Vm} \sin \omega t$ Where a polyphase output is required, operational means are coupled to the sine and cosine digital to analog converters to algebraically sum the voltage Vm $\cos\omega t$ and Vm $\sin \omega t$ to provide the polyphase output voltages.

DESCRIPTION OF AN EXEMPLARY EMBODIMENT

Figures 1, 2, 3:
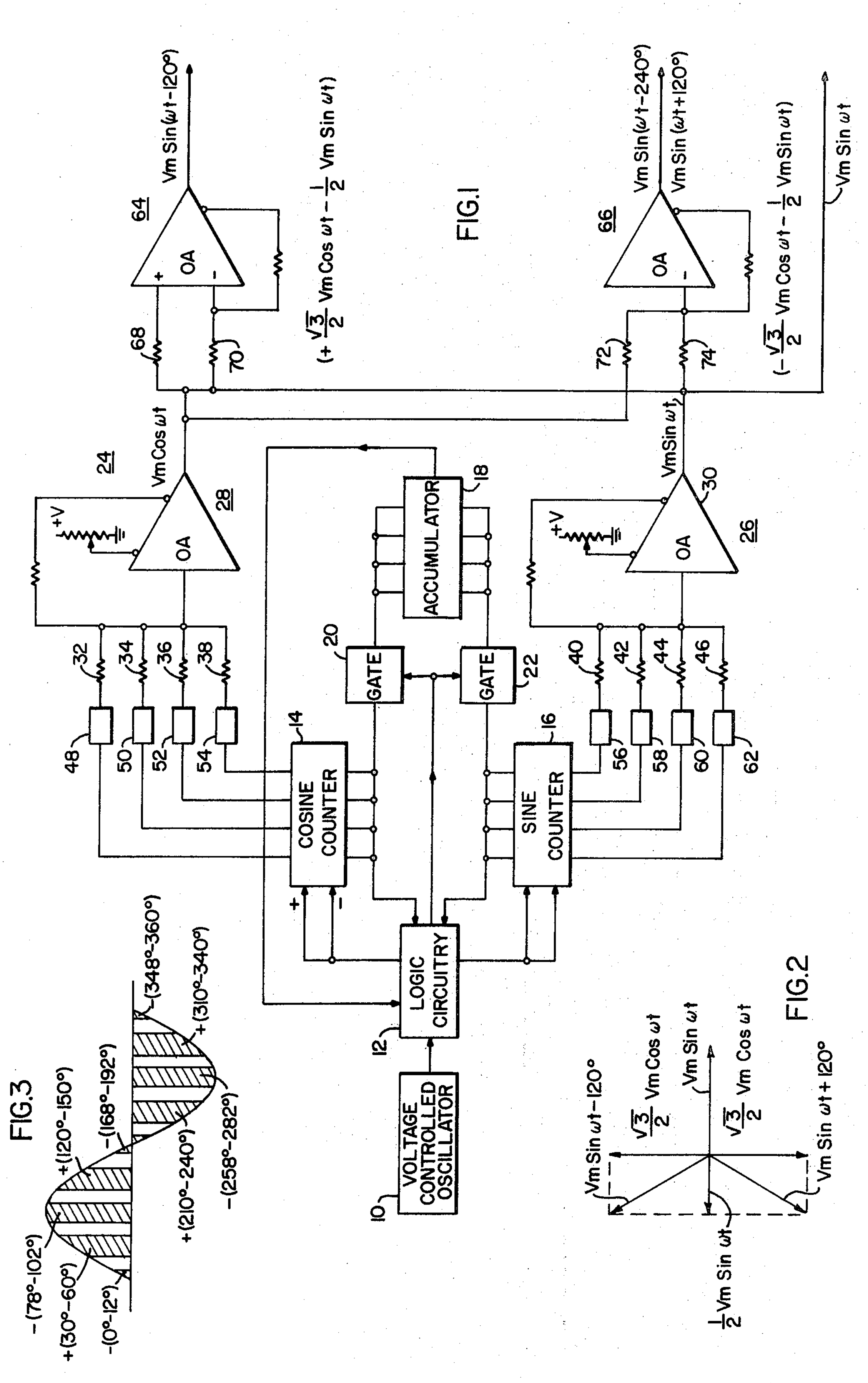
FIG. 1 is an electrical schematic showing the voltage reference source in accordance with the invention.
FIG. 2 is a vector diagram showing the algebraic summation of voltages to provide a three phase voltage source.
FIG. 3 is a diagram used in explaining the invention, depicting sine and cosine waveforms, the shaded areas delineating the angular intervals wherein counting is speeded up and slowed down, respectively identified by the + and − signs.

Referring now to FIG. 1 of the drawing, a pulse source, which may be a voltage controlled oscillator, is shown at 10. The pulses generated by the source 10 are controlled by logic circuitry indicated generally at 12. A pair of reversible counters for the cosine and sine functions are identified at 14 and 16 respectively. An accumulator 18 receives count pulses through the gates 20 and 22. As will be explained, the cosine counter digitally develops a cosine wave $v \cos\omega t$ which is applied to a digital to analog converter indicated generally at 24. Similarly, the sine counter digitally generates a sinusoidal wave Vm $\sin \omega t$ which is applied to a digital to analog converter 26.

The digital to analog converters 24, 26 are here illustrated as operational amplifiers 28, 30 having a plurality of input resistors 32, 34, 36, 38; 40, 42, 44, 46, weighted in accordance with the code utilized (8421 etc). the input to the amplifiers 28, 30 being controlled by FET (field effect transistors) switches symbolically indicated at 48, 50, 52, 54; 56, 58, 60, 62.

The outputs of the digital to analog converters 24, 26 are Vm $\cos\omega t$ and Vm $\sin \omega t$ respectively. In many applications a three phase supply is desired. As shown in FIG. 2, the components for phase voltages Vm $\sin(\omega t - 120°)$ Vm $\sin(\omega t + 120°)$ may be obtained from the outputs of the digital to analog converters 24, 26. The outputs Vm$\cos\omega t$ and Vm $\sin\omega t$ are applied to operational amplifiers 64, 66 arranged for summation of the input to the amplifiers being applied through weighted resistors 68, 70; 72, 74.

At the beginning of operation the cosine counter 14 is set to the maximum count of the counter. This may be 100, or 1,000 etc. depending upon the capacity of the counter, the greater the capacity the more accurate the generated sinusoidal waves. The sine counter 16 is set at zero. The count in the accumulator 18 is arbitrary since it is only the change in sign that is of interest. It should be noted that the value ZERO must be assigned to the positive or negative state.

Between 0° – 90°, as each pulse arrives from the pulse source 10, it is automatically gated by the logic circuitry to either the sine or cosine counters 14, 16 and the count in the respective counter is automatically gated to the accumulator 18. The contents of the accumulator 18 are the difference between what has been gated to it from the sine and cosine counters 14, 16. The logic may be set up so that for positive accumulator contents an incoming pulse is gated to the sine counter 14 increasing its count by one and gating its contents to the accumulator 18 in the negative sense. If the contents of the accumulator are negative, the incoming pulse is gated to the cosine counter 14 decreasing its count by one and gating its contents to the accumulator in the positive sense; this process is repetitive.

At 90° the sine counter 16 is at a maximum and the cosine counter is 0. The logic circuitry now interprets positive accumulator counts to cause an incoming pulse to be gated to the cos counter 14 increasing its count by one (in the negative direction), and gating its contents to the accumulator 18 in the negative sense. Similarly, negative accumulator counts cause the incoming pulse to be gated to the sine counter decreasing the contents by one and gating its contents to the accumulator 18 in the positive sense.

As shown in FIG. 3, the various intervals are identified and prefixed with a + or a −. The rate of change of the counters 14, 16 is slowed down in the interval marked −, and it is increased in the interval marked +. This is accomplished in the logic circuitry by periodically blocking a pulse from the pulse source 10 when slowing down, and periodically inserting an extra pulse when speeding up.

The intervals are identified readily by the logic circuitry, recognition being accomplished by determining the number of counts corresponding to the particular ordinate. For example, if a 1,000 count counter is used, the sin of 90° is 1000 and the sin of 12° is = 208 counts.

The sin and cosine counters 14, 16 may be reversible binary counters. The accumulator 18 may be a multibit adder with associated memory or a reversible binary counter using a serial technique to add in the contents of the sine or cosine counters.

The frequency of the voltage source is controlled by changing the frequency of the pulse source 10. The amplitude of the voltage output is determined by the magnitude of the voltage reference V to the digital to analog converters 26, 28. Shifting of phase is accomplished by a momentary change in the frequency of the pulse source 10.

I claim as my invention:

1. A voltage source comprising:

a. means for producing pulses;

b. means for digitally counting a cosine function through 360 electrical degrees;

c. means for digitally counting a sine function through 360 electrical degrees;

d. means coupled to said pulse means and said sine and cosine counting means for logically directing the digital counting in ordered fashion in accordance with the sine and cosine functions;

e. means coupled to said cosine counting means for converting the digital intelligence into an analog cosine waveform $v = Vm \cos\omega t$; and f. means coupled to said sine counting means for converting the digital intelligence into an analog sine waveform $v = Vm \sin\omega t$.

2. A voltage source according to claim 1 wherein: said pulse means is a voltage controlled oscillator.

3. A voltage source according to claim 1 wherein said sine and cosine counting means are reversible binary counters.

4. A voltage source according to claim 1 wherein: said cosine and sine digital to analog converting means comprise respectively an operational amplifier having input resistors and switching means, the input resistors being ohmically weighted in accordance with the counting code being utilized, the input resistors being connected to the associated counting means through said switching means.

5. A voltage source according to claim 1 comprising first and second operational amplifier means coupled to said sine and cosine digital to analog converters to algebraically sum $Vm \cos\omega t$ and $Vm \sin\omega t$ to produce $Vm \sin(\omega t-120°)$ and $Vm \sin(\omega t + 120°)$.

6. A voltage source according to claim 1 wherein said logic means comprises means for slowing down said counting means in the intervals: 0°–12°, 78°–102°, 168°–192°, 348°–360° and for speeding up said counting means in the interval 30°–60°, 120°–150°, 210°–240° and 310°–340°.

7. A voltage source according to claim 1 wherein said pulse means is adjustable so as to control the frequency of said output waves $Vm \cos\omega t$ and $Vm \sin\omega t$

8. A voltage source according to claim 1 wherein said digital to analog converter means includes a variable voltage supply to vary $Vm$ .

9. A voltage source according to claim 1 wherein said pulse means is momentarily varied to change the phase of $Vm \cos\omega t$ and $Vm \sin\omega t$.

10. A voltage source comprising:

a. means for producing pulses;

b. means for digitally counting a cosine function through 360° electrical degrees;

c. means for digitally counting a sine function through 360 electrical degrees;

d. means coupled to said pulse means and said sine and cosine counting means for logically directing the digital counting in ordered fashion in accordance with the sine and cosine functions, said logic means slowing down said counting means in the intervals 0°–12°, 78°–102°, 168°–192°, 348°–360°, and speeding up said counting means in the intervals 30°–60°, 120°–150°, 210°–240° and 310°–340°;

e. means coupled to said cosine counting means for converting the digital intelligence into an analog cosine waveform $v = Vm \cos\omega t$;

f. means coupled to said sine counting means for converting the digital intelligence into an analog sine waveform $v = Vm \sin\omega t$; and g. first and second operational amplifier means coupled to said sine and cosine digital to analog converters to algebraically sum $Vm \cos\omega t$ and $Vm \sin\omega t$ to produce $Vm \sin(\omega t-120°)$ and $Vm \sin(\omega t + 120°)$ which with the output $Vm \sin\omega t$ provides a symmetrical three phase voltage output.

* * * * *